United States Patent
Sirigu (10) Patent No.: US 12,175,324 B1
(45) Date of Patent: Dec. 24, 2024

(54) PHOTOELECTRIC SENSOR WITH IMPROVED LIGHT SPOT OVERLAP AND RELATED METHOD

(71) Applicant: Datalogic IP Tech, S.r.l., Bologna (IT)

(72) Inventor: Gianluca Sirigu, Cagliari (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 18/461,227

(22) Filed: Sep. 5, 2023

(51) Int. Cl.
*G06K 7/10* (2006.01)

(52) U.S. Cl.
CPC ..... *G06K 7/10831* (2013.01); *G06K 7/10732* (2013.01)

(58) Field of Classification Search
CPC ............ G06K 7/10831; G06K 7/10732
See application file for complete search history.

(56) References Cited

U.S. PATENT DOCUMENTS

2004/0112962 A1* 6/2004 Farrall ............... G08B 13/2442
235/462.01

* cited by examiner

*Primary Examiner* — Matthew Mikels
(74) *Attorney, Agent, or Firm* — Cozen O'Connor (57) ABSTRACT

A photoelectric sensor includes an emitter that emits a plurality of light beams. Fractions thereof pass through transparent portions of a first body and a second body in series before intersecting an optically powered surface, which directs the fractions to a target focusing an image that passes through a perimeter of the first body in one direction and focusing an image that passes through a perimeter of the second body in a perpendicular direction. The emitter, first and second bodies, and the optically powered surface are positioned so as to form a light spot on the target within which the fractions of the plurality of light beams substantially overlap. The fractions of the plurality of light beams reflect off of the target and are received by a receiver, which detects changes in the light to determine whether a mark is present on the target.

20 Claims, 6 Drawing Sheets

PHOTOELECTRIC SENSOR WITH IMPROVED LIGHT SPOT OVERLAP AND RELATED METHOD

BACKGROUND

Technical Field

The present disclosure relates to optics in general, and more specifically to photoelectric sensors that transmit and focus multiple light beams onto a target.

Description of the Related Art

Photoelectric sensors detect objects through a variety of optical properties. Known photoelectric sensors typically include an emitter that emits light and a receiver that receives light. The emitter is typically positioned such that light emitted from the emitter is interrupted or reflected by the object to be detected. This interruption or reflection changes the amount of light that arrives at the receiver. The receiver detects this change in the amount of light, and produces an output based on the detected change.

Known uses of photoelectric sensors include identifying objects or features of objects, such as the presence of a mark (e.g., a machine-readable symbol) on a surface of the object(s). Photoelectric sensors may be used to distinguish the mark on an object from other, different marks. Marks are distinguishable, either from a background surface of the object or from other marks, based on differences in their reflectivity, color, or other characteristics.

The marks detectable by photoelectric sensors include machine-readable symbols, which encode useful, optically-readable information about the items to which they are attached or otherwise associated. The information is encoded in a form that can be optically read via a machine-readable symbol reader.

Machine-readable symbols encode information (e.g., a character string or a number) as a set of shapes (e.g., bars and spaces or OCR digits) with varying dimensions based on the rules of a machine-readable symbology. A large number of symbologies have been developed and are in use, for example Universal Product Code (UPC), European Article Number (EAN), Code 39, Code 128, Data Matrix, PDF417, OCR A, OCR B, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display.

Machine-readable symbols take a variety of forms. Examples of known machine-readable symbols include a bar code (a linear or one dimensional symbol) and area matrix code symbols (e.g., QR codes), which are two dimensional symbols. According to one embodiment, a machine-readable symbol may be in the form of a print/contrast mark. In certain industries (e.g., packaging) processes such as cutting, punching, or alignment may be controlled by print marks on an underlying surface (e.g., a roll of film). Each time a print mark is detected (e.g., by a machine-readable symbol reader in the form of a contrast reader), a process may be triggered.

These machine-readable symbols are typically composed of patterns of high and low reflectance areas. Bar codes include alternating bars (i.e., relatively dark areas) and spaces (i.e., relatively light areas). The pattern of alternating bars and spaces and the widths of those bars and spaces represent a string of binary ones and zeros, and the width of any particular bar or space is an integer multiple of a specified minimum width, referred to as a "module" or "unit." Thus, to decode the information, a bar code reader, such as an imager-based reader, must be able to reliably discern the pattern of bars and spaces, such as by determining the locations of edges demarking adjacent bars and spaces from one another, across the entire length of the bar code.

Area matrix symbols may include a pattern of black marks (e.g., bars, squares or hexagons) on a white background. Machine-readable symbols are not limited to being black and white, but may comprise two other colors, and may include more than two colors (e.g., more than black and white). Machine-readable symbols may include directly marked materials (i.e., direct part marking or DPM) having the symbols formed in surface relief (e.g., etched or otherwise inscribed in a surface). A QR code typically includes a plurality of black (or darker) squares arranged within a white (or lighter) background. Data is extracted from the patterns present in both the horizontal and vertical components of the QR code.

Some known photoelectric sensors use an RGB (red-green-blue) LED light source to probe the object and identify a mark carried by the object. One of the problems with a photoelectric sensor that includes an RGB light source is that the three different light spots (one where each of the red, green, and blue light beams intersect the object) do not overlap with each other, resulting in the collective light spot of the photoelectric sensor being unfocused on the target object.

The lack of light spot overlap can result in an aesthetic issue when the three diodes (red, green, and blue) are switched on simultaneously in a color photoelectric sensor. Additionally, the lack of overlap of the light spots can result in a decrease in performance or accuracy of the photoelectric sensor due to the light spots impinging the target object in different positions. Known solutions to the light spot overlap problem drastically reduce the brightness of the light emitted from the emitter.

Thus, Applicant has determined that photoelectric sensor performance could be improved by generating a sharp and bright collective light spot on a target object.

BRIEF SUMMARY

A photoelectric sensor includes an emitter that emits multiple light beams toward a target. The photoelectric sensor focuses the collective light spot on the target such that respective light spots of each of the multiple light beams overlap on the target, while minimizing reduction of the brightness of the collective light spot.

According to one embodiment, a photoelectric sensor includes an emitter, an optically powered surface, a first body, and a second body. The emitter emits a plurality of light beams, and each of the plurality of light beams exits the emitter along a respective principal axis that intersects the emitter at discrete locations. The optically powered surface is positioned relative to the emitter such that a respective portion of each of the plurality of light beams intersects the optically powered surface.

The first body includes a first portion that is opaque with respect to the plurality of light beams and a second portion that is transparent with respect to the plurality of light beams. The first body is positioned between the emitter and the optically powered surface such that a first fraction of each of the plurality of light beams passes through the second portion and a second fraction of each of the plurality of light beams intersects the first portion.

The second body includes a first portion that is opaque with respect to the plurality of light beams and a second portion that is transparent with respect to the plurality of light beams. The second body is positioned between the first body and the optically powered surface such that a third fraction of each of the plurality of light beams passes through both the second portion of the first body and the second portion of the second body and a fourth fraction of each of the plurality of light beams passes through the second portion of the first body and intersects the first portion of the second body.

According to one embodiment, the photoelectric sensor includes a receiver positioned to receive the third fraction of the plurality of light beams after the third fraction of the plurality of light beams reflect off of a target. The receiver detects changes in the received reflective light over time.

According to one embodiment, a method of detecting a mark on a target includes emitting a plurality of light beams from an emitter and toward a first body. The method further includes passing a first fraction of each of the plurality of light beams through a transparent portion of the first body, blocking a second fraction of each of the plurality of light beams with an opaque portion of the first body, passing a third fraction of each of the plurality of light beams through a transparent portion of a second body, and blocking a fourth fraction of each of the plurality of light beams with an opaque portion of the second body.

The method further includes directing the third fraction of each of the plurality of light beams toward the target via an optically powered surface positioned between the second body and the target with respect to a path of each of the plurality of light beams. The optically powered surface focusing an image of the first fraction of each of the plurality of light beams that is formed within the transparent portion of the first body in a first direction and focusing an image of the third fraction of each plurality of light beams that is formed within the transparent portion of the second body in a second focal direction that is perpendicular to the first direction.

The method includes receiving the third fraction of each of the plurality of light beams via a receiver after the third fraction of each of the plurality of light beams intersects the target, and detecting changes in the light received by the receiver and, based on the detected changes, determining whether a mark is present on the target at a location coincident with an intersection of the plurality of light beams with the target.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the optical systems, photoelectric sensors, and machine-readable symbol readers have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

As used in this specification and the appended claims, the terms "active light source" or "active illumination source" mean a device or structure that generates light. Examples of active light sources or active illumination sources include, but are not limited to light emitting diodes (LEDs), flash strobes, incandescent or fluorescent lamps, or halogen bulbs. Such are typically responsive to some stimulus, for example an electric current or voltage.

Figure 1:
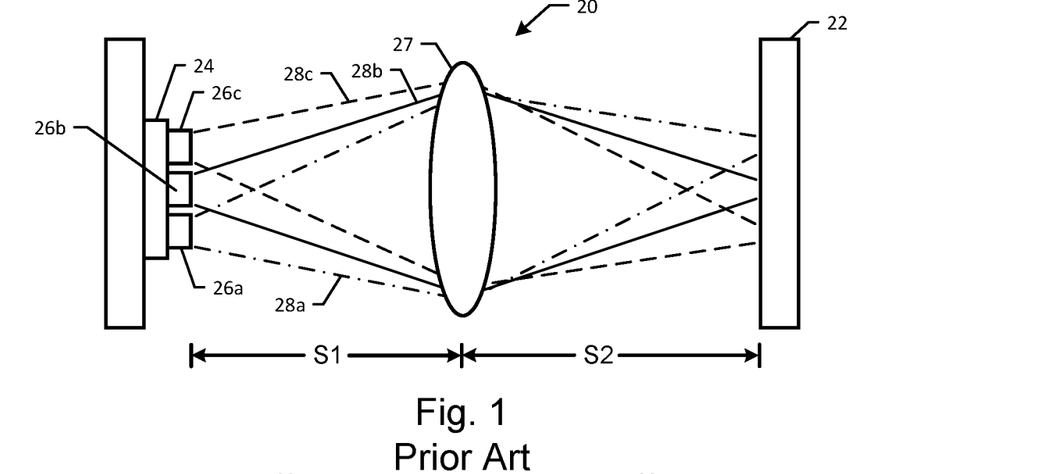
FIG. 1 is a schematic diagram side view of a known photoelectric sensor including a light emitter and a lens focusing light beams emitted from the emitter on a target.
Figure 2:
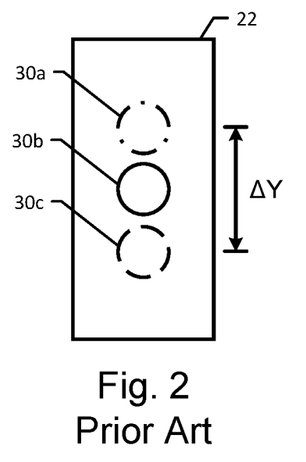
FIG. 2 is front view of the target of the known sensor illustrated in FIG. 1, showing locations of the intersection of the light beams emitted from the emitter and the target.
Figure 3:
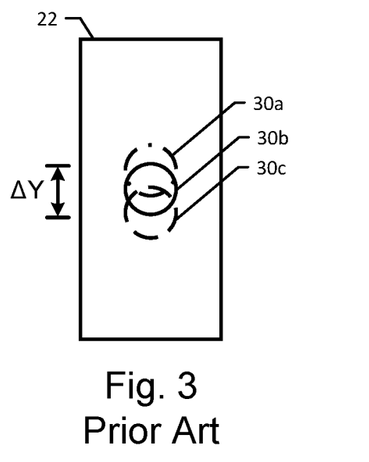
FIG. 3 is front view of the target of the known sensor illustrated in FIG. 1, showing alternate locations of the intersection of the light beams emitted from the emitter and the target.
Figure 4:
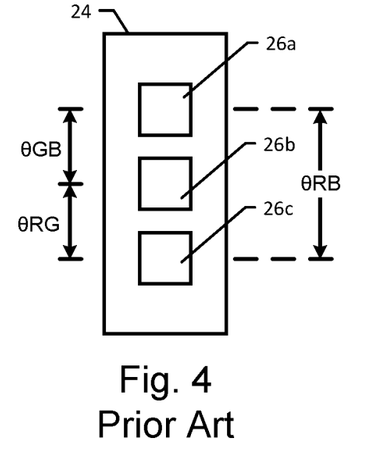
FIG. 4 is a front view of a known light emitter of the known sensor illustrated in FIG. 1.

The headings and Abstract of the Disclosure provided herein are for convenience only and do not limit the scope or meaning of the embodiments. Referring to FIGS. 1 to 3, a known photoelectric sensor 20 (often referred to as a "mark reader") may be used to detect the presence of marks on a target 22. The known photoelectric sensor 20 includes a light source 24 (e.g., one or more white light emitting diodes, or a plurality of differently colored light emitting diodes). As shown, the light source 24 may include a red diode 26a, a green diode 26b, and a blue diode 26c.

The known photoelectric sensor 20 includes a lens 27 that is optically powered so as to direct a red light beam 28a emitted from the red diode 26a, a green light beam 28b emitted from the green diode 26b, and a blue light beam 28c emitted from the blue diode 26c on the target 22. The target 22 may be an item on a conveyor that is being rapidly transported by the conveyor relative to the known photoelectric sensor 20.

As the target 22 passes through a red light spot 30a, a green light spot 30b, and a blue light spot 30c are present on the target 22 where the red, green, and blue light beams 28a, 28b, and 28c intersect the target, respectively. After contacting the target 22, the red, green, and blue light beams 28a, 28b, and 28c may be reflected towards a detector (not shown) of the known photoelectric sensor 20 that distinguishes differences in the reflectivity or color of the target 22 to identify a specific mark carried by the target 22.

Operation of the detector typically depends on the nature of the light source 24. If the light source 24 emits white light, the detector typically includes a color sensor having a sensitive area with different regions sensitive to three different colors (e.g., red, green, and blue). The proportionality of the response in these different regions allows the detector to detect the color of the target 22 passing through the emitted light from the light source 24.

Conversely, known photoelectric sensors 20 with an RGB LED ("red, green, blue light emitting diode") may toggle each color of the RGB LED at different times. The known photoelectric sensor 20 may include a teaching phase in which the detector learns to recognize/identify one or more particular mark(s) based on the contrast of the target, and the known photoelectric sensor 20 chooses the color of the RGB LED that has the best contrast reflectivity for a particular mark.

The known photoelectric sensor 20 may be a color sensor in which the three colors of the RGB LED are toggles on and off at different time delays and detection by the detector is triggered with such delay to correspond to that of the RGB LED toggling such that the detector recognizes when a particular color of the RGB LED impinges the detector. The delay among the three colors of the RGB LED is very short, resulting in a human eye (of an observer/user of the known photoelectric sensor 20) being incapable of seeing the color intermittence. This results in a white light spot where/if the three light spots 30a, 30b, and 30c overlap. As shown, the red, green, and blue light spots 30a, 30b, and 30c of the known photoelectric sensor 20 are discrete from one another (as shown in FIG. 2), or may partially overlap with one another (as shown in FIG. 3). Referring to FIGS. 1 to 4, the amount of overlap of the red, green, and blue light spots 30a, 30b, and 30c (referred to herein as AY) is dependent on a separation distance OY between the farthest diodes. As shown, the separation distance OY may be a separation distance ORB between the red diode 26a and the blue diode 26c of the light source 24, and the separation distance ORB may be a summation of a separation distance ORG between the red diode 26a and the green diode 26b and a separation distance 0 GB between the green diode 26b and the blue diode 26c. Additionally, the overlap AY is dependent on a separation distance S1 between the light source 24 and the lens 26, and is also dependent on a separation distance S2 between the lens 26 and the target 22. The formula below may be used to calculate the overlap AY for the known photoelectric sensor 20.

$$\Delta Y = \theta Y * \frac{S2}{S1}$$

As shown in the formula above, overlap AY can be reduced by reducing the separation distance OY. The separation distance OY can be reduced by using chip-on-board ("COB") technology. COB refers to the mounting of bare LED chips in direct contact with a substrate (such as silicon carbide or sapphire) to produce LED arrays, which allows for a much higher packing density of the LED array. One disadvantage to COB technology is that it is more expensive than alternative light source solutions.

Other known systems can be involved to mix different colored light beams emitted from the light source 24, such as positioning one or more light diffusers between the light source 24 and the target 22. However, the use of light diffusers results in the different colored light beams not being mixed efficiently when the diffuser is closer to the light source 24 of the known photoelectric sensor 20 and not being well focused in a sharp image when the diffuser is far from the light source 24. This is contrary to the general use case for color photoelectric sensors which are more efficient working with sharp images on the target 22 having a good color overlap.

Another known approach to mix different colored light beams emitted from the light source 24 includes positioning a slit formed in a body far from the light source 24. The farther the slit is from the light source 24, the better the different colored beams of light will be mixed. However, the farther the slit is from the light source 24, the lower the interception angle of the light beams with the slit. Lower interception angles result in lower radiant flux passing through the slit, as the radiant flux collected from the slit is proportional to the interception angle and is therefore inversely proportional to the distance from the light source 24 to the slit. Another factor that influences the performance of known contrast and color photoelectric sensor is the sharpness and the size of the light spot edges. Spot sharpness influences the ability of known photoelectric sensor 20 to distinguish a transition between the presence and absence of a mark on the target 22. Spot size is important when trying to distinguish mark size that depends on the market requirement.

Some known photoelectric sensor 20 with an RGB LED light source 24, having the red, green, and blue diodes 26a, 26b, and 26c aligned along one direction inside the LED package involve the focusing of the red, green, and blue light beams 28a, 28b, and 28c along the alignment direction (e.g., vertically or along a first direction D1 as shown in FIG. 1), and allowing the red, green, and blue light beams to remain out of focus in a transverse direction that is perpendicular to the alignment direction (e.g., into and out of the page or along a second direction D2 as shown in FIG. 1) to improve overlap of the red, green, and blue color spots 30a, 30b, and 30c (e.g., such that the red, green, and blue color spots 30a, 30b, and 30c substantially overlap).

According to one embodiment, at least half of the red color spot 30a overlaps with both the green color spot 30b and the blue color spot 30c. According to one embodiment, at least three-quarters of the red color spot 30a overlaps with both the green color spot 30b and the blue color spot 30c. According to one embodiment, at least ninety percent of the red color spot 30a overlaps with both the green color spot 30b and the blue color spot 30c.

The known photoelectric sensor 20 may include a lens 27 with different radii of curvature along the alignment and transverse directions (e.g., a first radius of curvature along the alignment direction and a second radius of curvature along the transverse direction). The lens 27 having different radii of curvature are negatively impacted by the light source 26 having non-homogenous light emission across the surface of each diode 26 (or other source of one of the plurality of light beams 30). Additionally, the lens 27 with different radii of curvature may focus additional stray light (e.g., coming from reflections inside the known photoelectric sensor 20) and direct that stray light toward the target 22. The result of this stray light results in halos and/or undesired secondary spots overlapping or adjacent with the light spots 30, thereby compromising quality of mark detection. Moreover, the light beams 30 being too defocused in the transverse direction will result in light spots 30 that are not sharp and/or that have an unwanted size.

Figure 5:
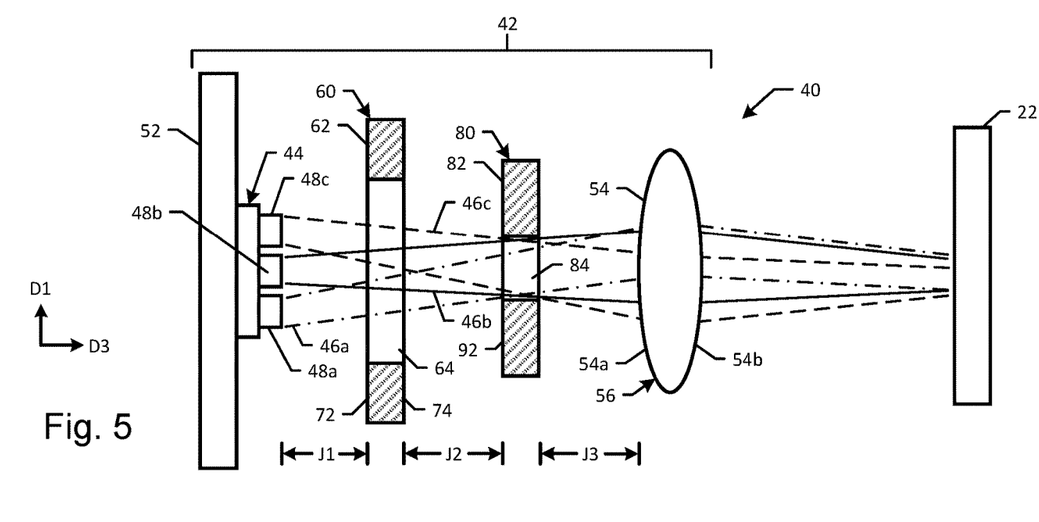
FIG. 5 is a schematic diagram of an optical system including a photoelectric sensor according to one embodiment.
Figure 6:
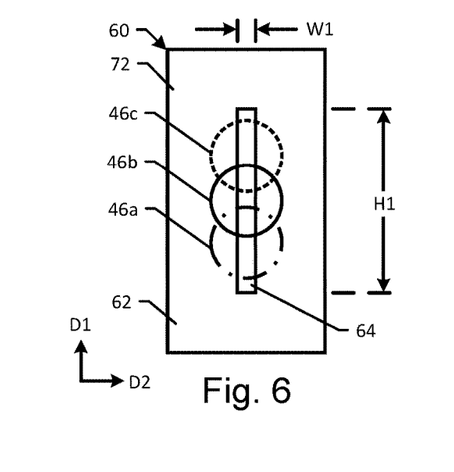
FIG. 6 is a front view of a first body of the photoelectric sensor illustrated in FIG. 5, according to one embodiment.
Figure 7:
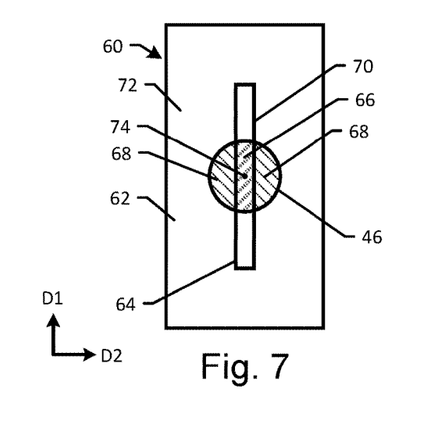
FIG. 7 is a front view of the first body of the photoelectric sensor illustrated in FIG. 5, according to one embodiment.
Figure 8:
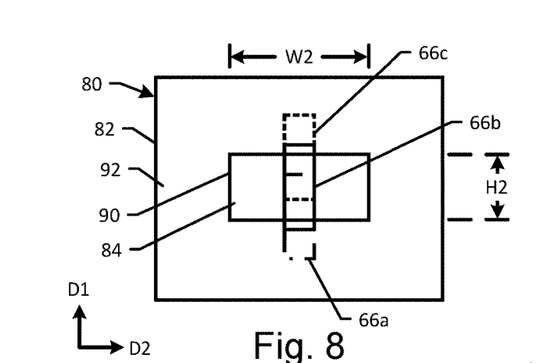
FIG. 8 is a front view of a second body of the photoelectric sensor illustrated in FIG. 5, according to one embodiment.
Figure 9:
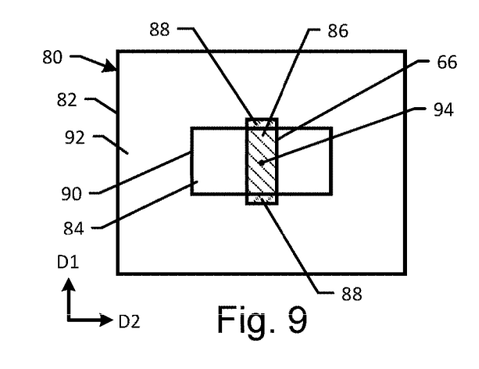
FIG. 9 is a front view of the second body of the photoelectric sensor illustrated in FIG. 5, according to one embodiment.
Figure 10:
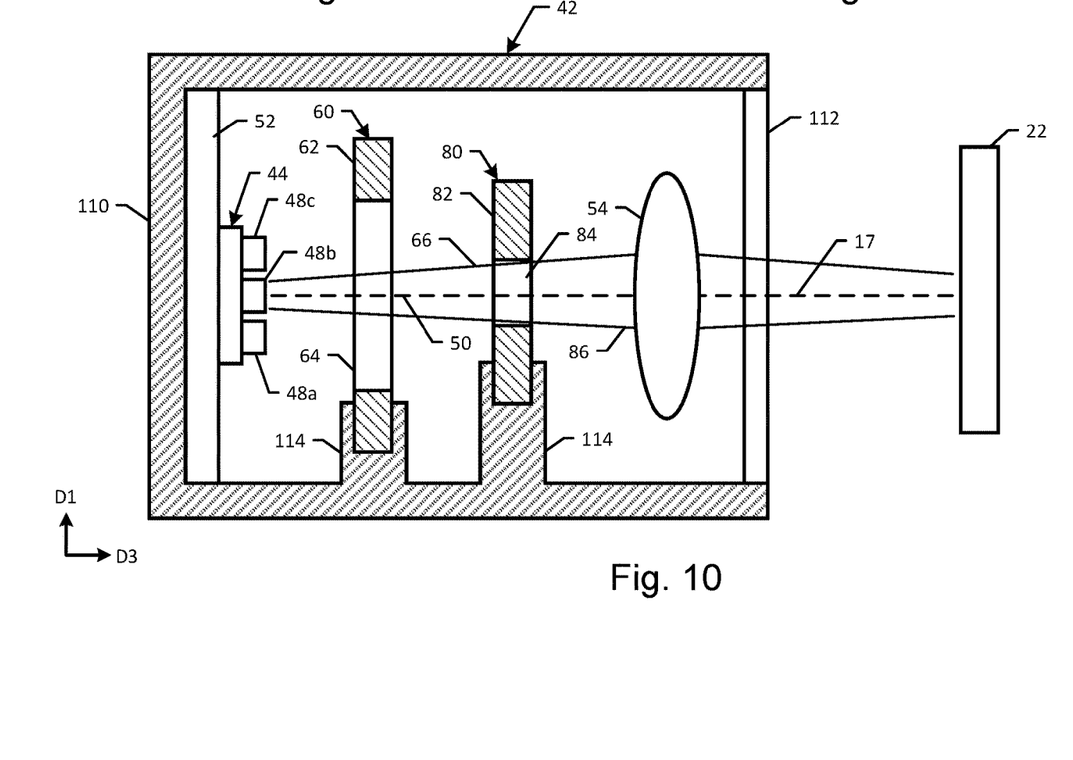
FIG. 10 is a schematic diagram of an optical system including a photoelectric sensor at least partially enclosed within a housing, according to one embodiment.
Figure 11:
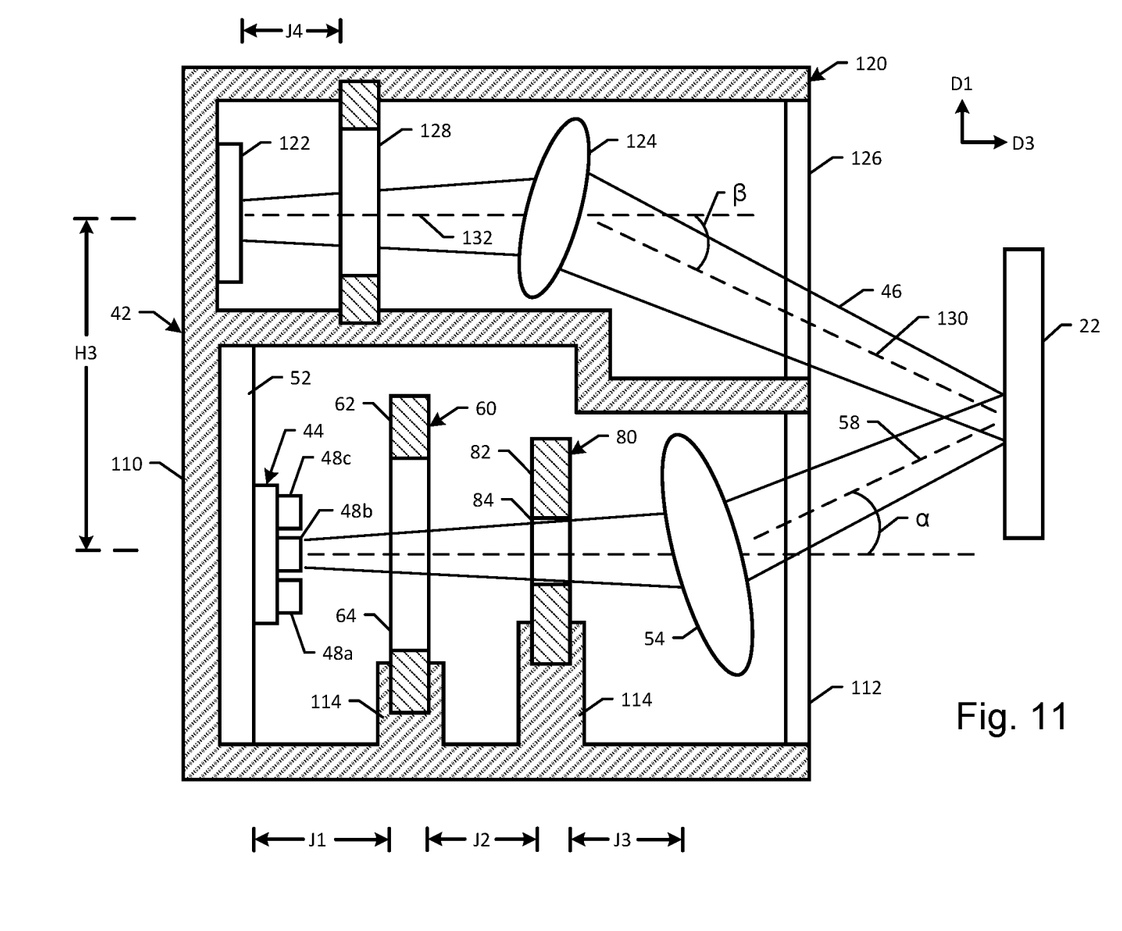
FIG. 11 is a schematic diagram of an optical system including a photoelectric sensor and a receiver at least partially enclosed within a housing, according to one embodiment.
Figure 12:
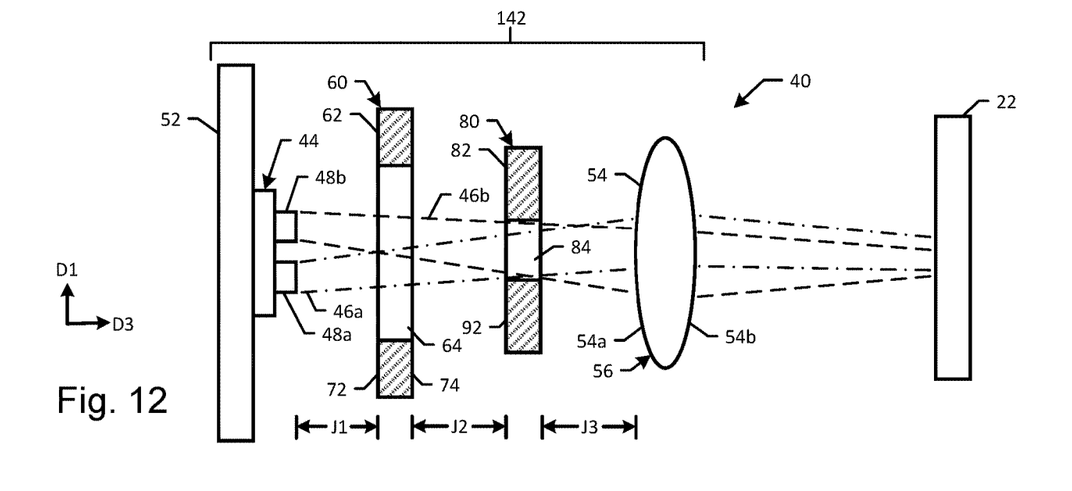
FIG. 12 is a schematic diagram of an optical system including a bar code scanner according to one embodiment.
Figure 13:
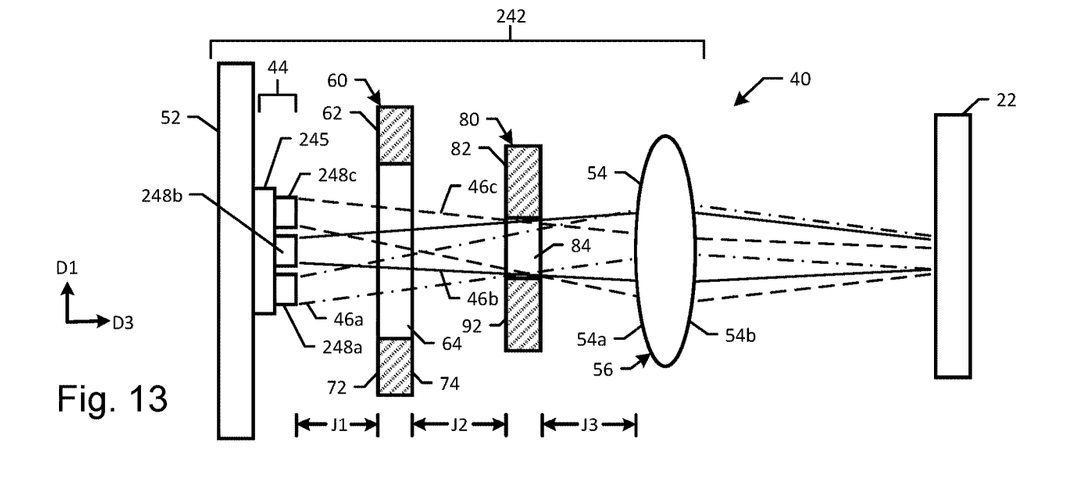
FIG. 13 is a schematic diagram of an optical system including a liquid crystal display according to one embodiment.

FIGS. 5 through 11 provide various depictions of a photoelectric sensor 42 according to embodiments of the disclosure. In particular, FIG. 5 is a schematic diagram of the photoelectric sensor 42. FIG. 6 is a front view of a first body 60 of the photoelectric sensor 42. FIG. 7 is another front view of the first body 60. FIG. 8 is a front view of a second body 80 of the photoelectric sensor 42. FIG. 9 is another front view of the second body 80. FIG. 10 is a schematic diagram of the photoelectric sensor 42 that includes a housing 110 at least partially enclosing one or more components of the photoelectric sensor 42. FIG. 11 is a schematic diagram of the photoelectric sensor 42 including a receiver at least partially enclosed within the housing 110. FIG. 12 is a schematic diagram of a bar code scanner 142 that may include one or more components of the photoelectric sensor 42, as described below. FIG. 13 is a schematic diagram of a liquid crystal display 242 that may include one or more components of the photoelectric sensor 42, as described below.

Referring to FIGS. 5 to 11, a photoelectric sensor 42 may include an emitter 44 that is an active light source and emits a plurality of light beams 46 through a first body 60 and a second body 80 of the photoelectric sensor 42 toward a target 22. In some embodiments, the photoelectric sensor 42 may also include one or more optically powered surface 54 to focus light toward the target 44. According to one embodiment, the emitter 44 includes an array of light emitting diodes ("LEDs"), for example an RGB LED with a red light emitting diode 48a that converts electricity into and emits a red light beam 46a (indicated by dash-dot lines), a green light emitting diode 48b that converts electricity into and emits a green light beam 46b (indicated by solid lines), and a blue light emitting diode 48c that converts electricity into and emits a blue light beam 46c (indicated by dashed lines).

Other embodiments of the emitter 44 may include alternate light sources to the RGB LED described above. According to one embodiment the emitter 44 may include two or more sources of white light. According to one embodiment the emitter 44 may include two or more sources of colored light (e.g., two or more sources of the same color of light, or two or more sources of different colors of light either in addition to or instead of red, green, and blue. Additionally, the red, green, and blue light emitting diodes 48a, 48b, and 48c may be arranged differently than as shown in the illustrated embodiment (e.g., from bottom to top, green, blue, red; or blue, red, green; or red, blue, green, etc.).

Each of the plurality of light beams 46 exits the emitter 44 (e.g., along a respective principal axis 50, one of which is shown in FIG. 10). Each of the principal axes 50 may intersect the emitter 44 at discrete locations, such that each of the plurality of light beams 46 exits the emitter at discrete locations that do not overlap one another. As shown, the discrete locations may include the red, green, and blue light emitting diodes 48a, 48b, and 48c, each of which is distanced from adjacent ones of the red, green, and blue light emitting diodes 48a, 48b, and 48c.

The red, green, and blue light emitting diodes 48a, 48b, and 48c may be positioned within the emitter 44 such that the respective principal axes 50 of the red, green, and blue light beams 46a, 46b, and 46c are parallel to one another. According to one embodiment, the red, green, and blue light emitting diodes 48a, 48b, and 48c may be positioned within the emitter 44 such that the respective principal axes 50 of the red, green, and blue light beams 46a, 46b, and 46c are non-parallel to one another.

The photoelectric sensor 42 may include a printed circuit board 52 that supports the emitter 44 and supplies electricity to the emitter 44 that is converted into the plurality of light beams 46. According to one embodiment, the photoelectric sensor 42 may be a component of an optical system 40. The optical system 40 may include a power supply that generates electricity, circuitry (e.g., a printed circuit board) that delivers electricity to the photoelectric sensor 42, and/or other hardware that cuts, punches, or aligns the target 22 upon detection of a mark by the photoelectric sensor 42. The optical system 40 may be a product that operates based on detection of a single spot with a color that is tunable by adjusting the injection current of the plurality of light beams 46.

The photoelectric sensor 42 may include one or more optically powered surfaces 54 positioned relative to the emitter 44 such that at least a portion of each of the plurality of light beams 46 exit the emitter 44 pass through the one or more optically powered surfaces 54. Reference to an object or surface of an object being "optically powered" indicates that the object or surface of the object causes light that enters the object or surface of the object to converge or diverge as the light passes through the object or surface of the object.

The photoelectric sensor 42 may include a lens 56 that includes one or more of the one or more optically powered surfaces 54. For example, the lens 56 may include a first optically powered surface 54a through which the red, green, and blue light beams 46a, 46b, and 46c enter the lens 56 and a second optically powered surface 54b through which the exit the lens 56 red, green, and blue light beams 46a, 46b, and 46c. As shown, the first optically powered surface 54a may face towards the emitter 44 and the second optically powered surface 54b may face towards the target 22.

The lens 56 may include an optical axis 58, about which the lens 56 is rotationally symmetrical. According to one embodiment, the optical axis 58 may be collinear with the principal axis 50 of the emitter 44 (e.g., a central one of the plurality of light emitting diodes 48). According to one embodiment, the optical axis 58 may be offset (noncollinear) with the principal axis 50 of the emitter 44 (e.g., a central one of the plurality of light emitting diodes 48). The lens 56 may be an anamorphic lens with two different radii of curvature (e.g., in the first direction D1 and the second direction D2).

Although depicted in the illustrated embodiment as a single lens, the one or more optically powered surfaces 54 may be part of one or more mirrors, one or more lenses, or a combination of one or more mirrors and one or more lenses arranged so as to direct and focus the light beams from the emitter 44 towards the target 22. For example, the one or more optically powered surfaces 54 may focus an image of a portion of the light beams (e.g., that passes through the first body 60 at a first distance from the emitter 44) in a first focal direction, and focus an image of another portion of the light beams (e.g., that passes through the second body 80 at a second distance from the emitter 44) in a second focal direction that is perpendicular to the first focal direction.

The photoelectric sensor 42 may include a first body 60 having a first portion 62 that is opaque with respect to the plurality of light beams 46. The first body 60 includes a second portion 64 that is transparent with respect to the plurality of light beams 46 and may extend through a thickness of the first body 62 as shown, so as to form a passage through the first body 60. According to one embodiment, the second portion 64 is a through hole formed in the first body 60. The second portion 64 may include a glass (i.e., non-optically powered) window within the through hole, or the through hole may be devoid of any solid matter.

The first body 60 may include a first perimeter 70 that is formed within a first surface 72 of the first body 60, the first surface 72 facing the emitter 44. As shown, the first perimeter 70 may be formed by a boundary between the first portion 62 and the second portion 64 of the first body 60.

The first perimeter 70 may be a rectangular shape or profile (i.e., a slit) or other polygon or irregular shape with a long dimension (e.g., a height H1) extending along the first direction D1 and a short dimension (e.g., a width W1) extending along the second direction D2 that is perpendicular to the first direction D1. According to one embodiment, the height H1 of the first perimeter 70 is greater than (e.g., between two and twenty times greater than) the width W1. According to one embodiment, the first perimeter 70 may form a shape with a center 74, and the first body 60 may be positioned relative to the emitter 44 such that the principal axis 50 of at least one of the plurality of light beams 46 passes through the center 74.

The photoelectric sensor 42 may include a second body 80 having a first portion 82 that is opaque with respect to the plurality of light beams 46. The second body 80 includes a second portion 84 that is transparent with respect to the plurality of light beams 46 and may extend through a thickness of the second body 80 as shown, so as to form a passage through the second body 80.

The second body 80 may include a second perimeter 90 that is formed within a first surface 92 of the second body 80, the second body facing the second surface 74 of the first body 60. The second perimeter 90 may be a rectangular shape or profile (i.e., a slit) or other polygon or irregular shape with a long dimension (e.g., a width W2) extending along the first direction D1 and a short dimension (e.g., a height H2) extending along the second direction D2. According to one embodiment, the width W2 of the second perimeter 80 is greater than (e.g., between two and twenty times greater than) the height H2.

As shown, the second perimeter 80 may form a shape with a center 94, and the second body 80 may be positioned relative to the emitter 44 such that the principal axis 50 of at least one of the plurality of light beams 46 passes through the center 84. The first perimeter 70 and the second perimeter 90 may be different shapes (e.g., a square and a rectangle), different sizes (e.g., a larger rectangle and a smaller rectangle), different orientations (a first rectangle with a shorter vertical dimension and a longer horizontal dimension and a second rectangle with a longer vertical dimension and a shorter horizontal dimension), or any combination thereof.

According to one embodiment, the first body 60 may be positioned between the emitter 44 and one of the one or more optically powered surfaces 54 (e.g., spaced apart from the emitter 44 by a first distance J1) such that a first fraction 66 of each of the plurality of light beams 46 passes through the second (transparent) portion 64 and a second fraction 68 of each of the plurality of light beams 46 intersects the first (opaque) portion 62 and is thereby blocked from passing through the first body 60. The first fraction 66 and the second fraction 68 of only one of the light beams 46 is shown in FIG. 7 for the sake of clarity. Each of the plurality of the light beams 46 exiting the emitter 44 (e.g., the red, green, and blue light beams 46a, 46b, and 46c) may have respective first fractions 66 (e.g., red, green, and blue first fractions) and second fractions 68 (e.g., red, green, and blue second fractions).

According to one embodiment, the second body 80 may be positioned between the first body 60 and the optically powered surface 54 (e.g., spaced from the first body 60 by a second distance J2) such that a third fraction 86 of each of the plurality of light beams 46 passes through the second (transparent) portion 84 and a fourth fraction 88 of each of the plurality of light beams 46 intersects the first (opaque) portion 82 and is thereby blocked from passing through the second body 80. The first distance J1 may be less than, equal to, or greater than the second distance J2. According to one embodiment, the second distance J2 may be more than double, more than triple, or between 2 and ten times more than the first distance J1.

The third fraction 86 and the fourth fraction 88 of only one of the light beams 46 is shown in FIG. 9 for the sake of clarity of the drawings. The first fraction 66 of each of the plurality of light beams 46 exiting the second (transparent) portion 64 (e.g., the red, green, and blue light beams 46a, 46b, and 46c) may have respective third fractions 86 and fourth fractions 88.

Thus, each of the plurality of light beams 46 may include the first fraction 66 that passes through the second (transparent) portion 64, the second fraction 68 that intersects the first (opaque) portion 62, a third fraction 86 that passes through both the second (transparent) portion 64 of the first body 60 and the second (transparent) portion 84 of the second body 80, and a fourth fraction 88 that passes through the second (transparent) portion 64 of the first body 60 and intersects the first (opaque) portion 82 of the second body 80. According to one embodiment, the third fraction 86 and the fourth fraction 88 are each subsets of the first fraction 66.

According to one embodiment, each of the plurality of light beams 46 may include three fractions: one that intersects the first (opaque) portion 62; another that passes through the second (transparent) portion 64 of the first body 60 and intersects the first (opaque) portion 82 of the second body 80, and another that passes through both the second (transparent) portion 64 of the first body 60 and the second (transparent) portion 84 of the second body 80. The fraction that passes through both the second (transparent) portion 64 and the second (transparent) portion 84 may then be directed to the target 22 (e.g., via the one or more optically powered surfaces 54).

As shown in FIG. 10, the photoelectric sensor 42 may include a housing 110 that at least partially encloses one or more components of the photoelectric sensor 42. The housing 110 may include a window 112 that provides passage for the plurality of light beams 46 out of the housing 110. According to one embodiment, the window 112 includes a transparent material (e.g., glass) that allows passage of the plurality of light beams 46 without affecting (converging or diverging) the plurality of light beams 46.

The housing 110 may include one or more supports 114 that secure components of the photoelectric sensor 42 (e.g., the printed circuit board 52, the emitter 44, the first body 60, the second body 80, or any combination thereof) relative to one another. The one or more supports 114 may be movable within the housing 110 so as to enable adjustment of distances between the components of the photoelectric sensor 42. For example, the first distance J1, the second distance J2, a third distance J3 measured from the second body 80 to the optically powered surface 54 (as shown in FIG. 5), or any combination thereof) may be adjusted to change a focal length of the photoelectric sensor 42 based on the expected location of the target 22. According to one embodiment, the third distance J3 may be more than double, more than triple, or between 2 and ten times more than the second distance J2.

As shown in FIG. 11, the photoelectric sensor 42 may include a receiver 120 through which the plurality of light beams 46 enter after reflecting off of the target 22. The receiver 120 may include a receiver element 122 that detects changes in the light received from the emitter 44 after reflecting off of the target 22. The photoelectric sensor 42 uses detected changes to identify the presence, absence, and/or identify of a mark on the target 22 (e.g., at a location coincident with an intersection of the plurality of light beams 46 with the target 22).

The receiver 120 may include one or more optically powered surfaces 124 (e.g., one or more lenses, mirrors, or combination of one or more lenses and one or more mirrors) that direct the one or more light beams 46 reflected off of the target 22 toward the receiver element 122. One or more of the components of the receiver 120 may be at least partially enclosed within a housing (e.g., the housing 110, or a similar but separate housing). The receiver housing may include a window 126 that provides passage for the plurality of light beams 46 into the receiver 120.

The photoelectric sensor 42 (e.g., the receiver 120) may include a third body 128 positioned so as to block stray light from entering the receiver element 122. As shown, the third body 128 may be positioned between the receiver element 122 and at least one (e.g., all) of the one or more optically powered surfaces 124. The third body 128 may be similar to the first body 60 or the second body 80 such that the description of the first body 60 and the second body 80 is applicable to the third body 128. The transparent and opaque portions of the third body may be the same (identical), similar (same shape but different size), or different than one or both of the corresponding portions of the first body 60 and the second body 80.

The following description is provided for exemplary purposes, and the recited values are not limiting to the embodiments of the photoelectric sensor 42 described herein. According to one embodiment, the first body 60 may be separated from the emitter 44 by the first distance J1, which is about 0.5 mm. The second body 80 may be separated from the first body 60 by the second distance J2, which is about 1.5 mm. The closest of the one or more optically powered surfaces 54 to the second body 80 may be separated from the second body 80 by the third distance J3, which is about 6.4 mm. The farthest of the one or more optically powered surfaces 54 from the second body 80 may be positioned relatively close to the window 112 (e.g., separated by about 0.6 mm). The third body 128 may be separated from the receiver element 122 by a fourth distance J4, of about 0.4 mm.

The optical axis 58 of the one or more optically powered surfaces 54 (e.g., the lens 56) may be angularly offset from the principal axis 50 of the emitter 44 (e.g., a central one of the plurality of light emitting diodes 48) by an angle $\alpha$. According to one embodiment, the angle $\alpha$ may be about 12°. Similarly, the one or more optically powered surface 124 may include an optical axis 130, which may be angularly offset from a principal axis 132 of the receiver element 122 by an angle $\beta$. According to one embodiment, the angle $\beta$ is the same as the angle $\alpha$. According to one embodiment, the angle $\beta$ is the different than the angle $\alpha$. According to one embodiment, the angle ß is about 12°.

The height H1 of the second portion 64 of the first body 60 may be about 2.7 mm, and the width W1 of the second portion 64 of the first body 60 may be about 0.28 mm. The height H2 of the second portion 84 of the second body 80 may be about 0.9 mm, and the width W2 of the second portion 84 of the second body 60 may be about 2.6 mm. According to one embodiment, the emitter 44 may be separated from the receiver element 122 by a third height H3. The height H3 may be about 7.5 mm.

Any or all of the values provided in the example above may be changed based on an expected distance from the photoelectric sensor 42 to the target 22. The values provided above, for example, may be optimized based on an expected distance of between about 9 mm to about 15 mm.

The photoelectric sensor 42 described in any of the embodiments herein may result in one or more advantages compared to the known photoelectric sensor 20, such as production of a light spot 30 with increased color overlap (e.g., of the red, green, and blue light emitting diodes 48a, 48b, and 48c) compared to the known photoelectric sensor 42. Additionally, or alternatively, the photoelectric sensor 42 may result in production of a light spot 30 with improved sharpness and/or homogeneity (e.g., via reduction of halos and/or undesired secondary spots overlapping or adjacent with the light spot 30). The photoelectric sensor 42 may optimize optical efficiency (i.e., the ratio between the output radiant flux and LED emitting radiant flux) to maximize the brightness of the light spot 30. One or more of these advantages are achieved via the use of cheap and affordable technologies/components within the photoelectric sensor 42.

The photoelectric sensor 42 may facilitate more precise relative positioning of the plurality of light spots 30 on the target 22. Thus, the photoelectric sensor 42 may be a component of an optical system 40 that relies on identification of multiple spots of different colors in specific, overlapped relative positions. The more precise relative positioning of the plurality of light spots 30 may also improve color detection of the target 22.

Referring to FIGS. 12 and 13, the optical system 40 may include other devices that include one or more components of the photoelectric sensor 42 as described above, such that the disclosure is not limited specifically to photoelectric sensors. According to one embodiment, the optical system 40 may include other optical devices that output and/or receive as an input multiple colors of light in the same (or substantially the same) spot. For example, as shown in FIG. 12, the optical system 40 may include a bar code reader 142 that switches a color of a light spot (e.g., from red to green, or vice versa). Such a light spot may be used to assist in the operation of the scanner and/or indicate the results of a barcode scan, such as a red spot for aiming that may switch to a green spot in response to a "good read" (i.e., a successful decode of a machine-readable symbol).

The bar code reader 142 may include a plurality of light sources (e.g., the red light emitting diode 48a and the green light emitting diode 48b). Other numbers, colors, and/or arrangements of the light sources may be provided within the emitter 44 to meet the desired functionality and/or performance goals of the bar code reader 142.

As shown in FIG. 13, the optical system 40 may include a liquid crystal display 242 that switches a color of one or more pixels. According to one embodiment, the emitter 44 may include a backlight 245 (e.g., that emits white light) and a plurality of color filters (e.g., a red color filter 248a, a green color filter 248b, and a blue color filter 248c). Other numbers, colors, and/or arrangements of the color filters may be provided within the emitter 44 to meet the functionality and/or performance goals of the liquid crystal display 242.

Figure 14:
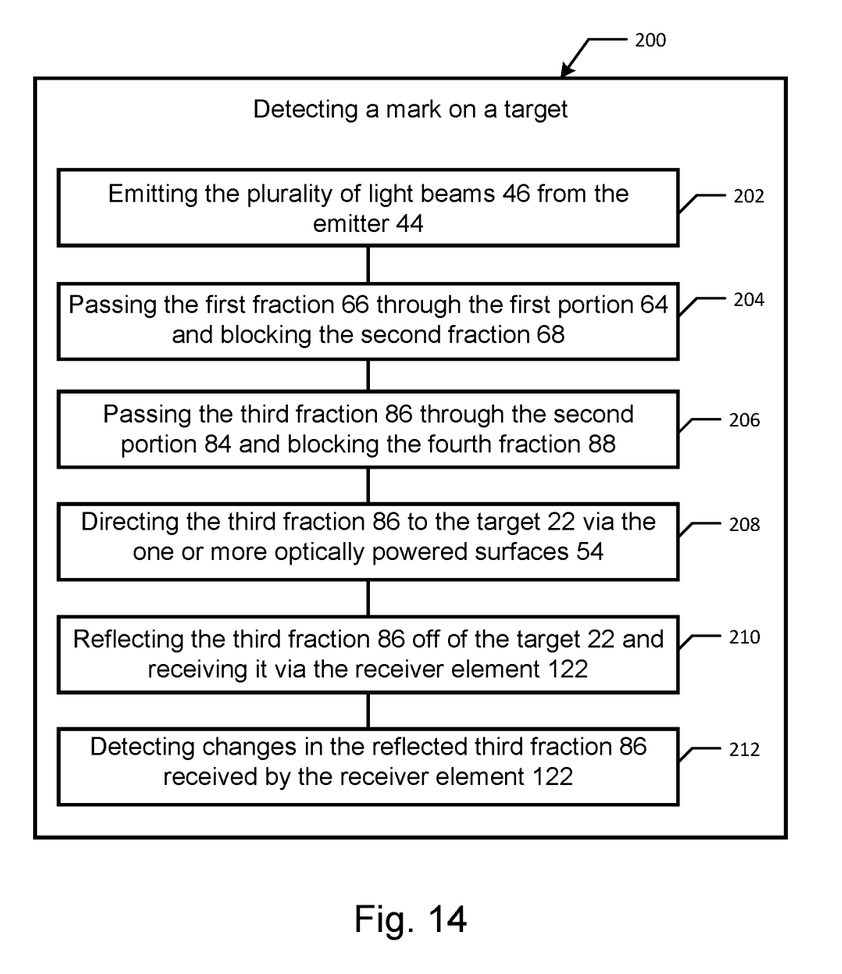
FIG. 14 is a flow chart of a method of detecting a mark on a target, according to one embodiment.

FIG. 14 is a flow chart of a method of detecting a mark on a target, according to one embodiment. Referring to FIGS. 5 to 14, the method of detecting a mark 200 (e.g., on the target 22) may include operation of a component of an optical system (e.g., the optical system 40), the component being a photoelectric sensor (e.g., the photoelectric sensor 42), a bar code scanner (e.g., the bar code scanner 142), or a liquid crystal display (e.g., the liquid crystal display 242). At 202, the method may include emitting light (e.g., the plurality of light beams 46) from an emitter (e.g., the emitter 44). At 204, the method may further include passing a first fraction (e.g., the first fraction 66) of the emitted light through a transparent portion of a first body (e.g., the second portion 64 of the first body 60) and blocking passage of a second fraction (e.g., the second fraction 68) of the emitted light with an opaque portion of the first body (e.g., the first portion 62 of the first body 60).

At 206, the method may further include passing a third fraction (e.g., the third fraction 86) of the emitted light through a transparent portion of a second body (e.g., the second portion 84 of the second body 80) and blocking passage of a fourth fraction (e.g., the fourth fraction 88) of the emitted light with an opaque portion of the second body (e.g., the first portion 82 of the second body 80). At 208, the method may include directing the third fraction of the emitted light toward a target via one or more optically powered surfaces (e.g., the one or more optically powered surfaces 54) so as to focus the image inside the first perimeter 70 in one focal direction and focus the image inside the second perimeter 90 in a second focal direction that is perpendicular to the first focal direction. As shown in FIG. 10, the optically powered surface 54 may be positioned between the second body 80 and the target 22 with respect to a path 17 of each of the plurality of light beams.

At 210, the method may further include receiving the third fraction of the emitted light after reflecting off of the target 22. According to one embodiment, the reflected light may be received by a receiver element (e.g., the receiver element 122). At 212, the method may further include detecting changes in the reflected light received by the receiver element to determine the presence, absence, or identity of a mark on the target 22.

Various embodiments of the apparatus, devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer-readable medium for use by or in connection with any computer and/or processor related system or method. In the context of this document, a memory is a computer-readable medium that is an electronic, magnetic, optical, or other another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium.

More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and transitory or transmission type media such as digital and analog communication links using TDM or IP based communication links (e.g., packet links).

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A photoelectric sensor comprising:
   an emitter that emits a plurality of light beams, each of the plurality of light beams exiting the emitter along a respective principal axis that intersect the emitter at discrete locations;
   an optically powered surface positioned relative to the emitter such that a respective portion of each of the plurality of light beams intersects the optically powered surface;
   a first body having a first portion that is opaque with respect to the plurality of light beams and a second portion that is transparent with respect to the plurality of light beams, the first body positioned between the emitter and the optically powered surface such that a first fraction of each of the plurality of light beams passes through the second portion and a second fraction of each of the plurality of light beams intersects the first portion;
   a second body having a first portion that is opaque with respect to the plurality of light beams and a second portion that is transparent with respect to the plurality of light beams, the second body positioned between the first body and the optically powered surface such that a third fraction of each of the plurality of light beams passes through both the second portion of the first body and the second portion of the second body and a fourth fraction of each of the plurality of light beams passes through the second portion of the first body and intersects the first portion of the second body; and
   a receiver positioned to receive the third fraction of the plurality of light beams after the third fraction of the plurality of light beams reflect off of a target and detect changes in the received reflective light over time.

2. The photoelectric sensor of claim 1 wherein a boundary between the first and second portions of the first body forms a first perimeter within a first surface of the first body that faces the emitter, and a boundary between the first and second portions of the second body forms a second perimeter within a first surface of the second body that faces the first body, and the first perimeter is a different shape, size, orientation, or any combination thereof than the second perimeter.

3. The photoelectric sensor of claim 2 wherein the first perimeter has a rectangular profile with a long dimension extending along a first direction and a short dimension extending along a second direction that is perpendicular to the first direction, and the second perimeter has a rectangular profile with a long dimension extending along the second direction and a short dimension extending along the first direction.

4. The photoelectric sensor of claim 3 wherein a length of the long dimension of the first perimeter is different than a length of the long dimension of the second perimeter, a length of the short dimension of the first perimeter is different than a length of the short dimension of the second perimeter, or both a length of the long dimension of the first perimeter is different than a length of the long dimension of the second perimeter and a length of the short dimension of the first perimeter is different than a length of the short dimension of the second perimeter.

5. The photoelectric sensor of claim 2 wherein the first perimeter forms a first shape with a first center, the second perimeter forms a second shape with a second center, and the first body and the second body are positioned relative to the emitter such that the respective principal axis of at least one of the plurality of light beams passes through both the first center and the second center.

6. The photoelectric sensor of claim 3 wherein the intersections of the respective principal axis of each of the plurality of light beams with the emitter are aligned along the first direction.

7. The photoelectric sensor of claim 6 wherein the emitter includes a plurality of light emitting diodes, and respective ones of the plurality of light beams exit respective ones of the plurality of light emitting diodes.

8. The photoelectric sensor of claim 7 wherein the plurality of light emitting diodes includes a red light emitting diode, a green light emitting diode, and a blue light emitting diode.

9. A photoelectric sensor comprising:
   an emitter that emits a plurality of light beams, each of the plurality of light beams exiting the emitter along a respective principal axis that intersect the emitter at discrete locations;
   an optically powered surface positioned relative to the emitter such that a respective portion of each of the plurality of light beams intersects the optically powered surface;
   a first body having a first portion that is opaque with respect to the plurality of light beams and a second portion that is transparent with respect to the plurality of light beams, the first body positioned between the emitter and the optically powered surface such that a first fraction of each of the plurality of light beams passes through the second portion and a second fraction of each of the plurality of light beams intersects the first portion;

a second body having a first portion that is opaque with respect to the plurality of light beams and a second portion that is transparent with respect to the plurality of light beams, the second body positioned between the first body and the optically powered surface such that a third fraction of each of the plurality of light beams passes through both the second portion of the first body and the second portion of the second body and a fourth fraction of each of the plurality of light beams passes through the second portion of the first body and intersects the first portion of the second body, wherein the first body is separated from the emitter by a first distance as measured along the respective principal axis of one of the plurality of light beams, the second body is separated from the first body by a second distance as measured along the respective principal axis of the one of the plurality of light beams, and the first distance is different than the second distance.

10. The photoelectric sensor of claim 9 wherein the optically powered surface is separated from the second body by a third distance as measured along the respective principal axis of the one of the plurality of light beams, and the third distance is different than the first distance, the second distance, or both the first distance and the second distance, and the optically powered surface focuses an image of the first fraction of each of the plurality of light beams that is formed within the second portion of the first body in a first focal direction, and focuses an image of the third fraction of each of the plurality of light beams that is formed within the second portion of the second body in a second focal direction that is perpendicular to the first focal direction.

11. A photoelectric sensor comprising:
an emitter that emits a plurality of light beams, each of the plurality of light beams exiting the emitter along a respective principal axis that intersect the emitter at discrete locations;
an optically powered surface positioned relative to the emitter such that a respective portion of each of the plurality of light beams intersects the optically powered surface;
a first body having a first portion that is opaque with respect to the plurality of light beams and a second portion that is transparent with respect to the plurality of light beams, the first body positioned between the emitter and the optically powered surface such that a first fraction of each of the plurality of light beams passes through the second portion and a second fraction of each of the plurality of light beams intersects the first portion;
a second body having a first portion that is opaque with respect to the plurality of light beams and a second portion that is transparent with respect to the plurality of light beams, the second body positioned between the first body and the optically powered surface such that a third fraction of each of the plurality of light beams passes through both the second portion of the first body and the second portion of the second body and a fourth fraction of each of the plurality of light beams passes through the second portion of the first body and intersects the first portion of the second body, wherein the optically powered surface is anamorphic having a first radius of curvature and a second radius of curvature, the first radius of curvature perpendicular to the second radius of curvature, and the first radius of curvature being different than the second radius of curvature.

12. A photoelectric sensor comprising:
an emitter that emits a plurality of light beams, each of the plurality of light beams exiting the emitter along a respective principal axis that intersect the emitter at discrete locations;
an optically powered surface positioned relative to the emitter such that a respective portion of each of the plurality of light beams intersects the optically powered surface;
a first body having a first portion that is opaque with respect to the plurality of light beams and a second portion that is transparent with respect to the plurality of light beams, the first body positioned between the emitter and the optically powered surface such that a first fraction of each of the plurality of light beams passes through the second portion and a second fraction of each of the plurality of light beams intersects the first portion;
a second body having a first portion that is opaque with respect to the plurality of light beams and a second portion that is transparent with respect to the plurality of light beams, the second body positioned between the first body and the optically powered surface such that a third fraction of each of the plurality of light beams passes through both the second portion of the first body and the second portion of the second body and a fourth fraction of each of the plurality of light beams passes through the second portion of the first body and intersects the first portion of the second body, wherein the optically powered surface is a first optically powered surface, and the photoelectric sensor further comprises a lens that includes the first optically powered surface and a second optically powered surface, the lens positioned relative to the emitter such that the third fraction of each of the plurality of light beams enters the lens through the first optically powered surface and exits the lens through the second optically powered surface.

13. The photoelectric sensor of claim 1, further comprising a housing at least partially enclosing the emitter, the optically powered surface, the first body, and the second body.

14. The photoelectric sensor of claim 13 wherein the housing at least partially encloses the receiver.

15. A method of detecting a mark on a target, the method comprising:
positioning a first body a first distance from the emitter, the first distance measured along a direction;
positioning a second body a second distance from the first body, the second distance measured along the direction;
emitting a plurality of light beams from an emitter and toward the first body;
passing a first fraction of each of the plurality of light beams through a transparent portion of the first body;
blocking a second fraction of each of the plurality of light beams with an opaque portion of the first body;
passing a third fraction of each of the plurality of light beams through a transparent portion of the second body;
blocking a fourth fraction of each of the plurality of light beams with an opaque portion of the second body;
directing the third fraction of each of the plurality of light beams toward the target via an optically powered surface positioned between the second body and the target with respect to a path of each of the plurality of light beams;

receiving the third fraction of each of the plurality of light beams via a receiver after the third fraction of each of the plurality of light beams intersects the target; and detecting changes in the light received by the receiver and based on the detected changes determining whether a mark is present on the target at a location coincident with an intersection of the plurality of light beams with the target.

16. A method of detecting a mark on a target, the method comprising:

positioning a first body a first distance from the emitter, the first distance measured along a direction;

positioning a second body a second distance from the first body, the second distance measured along the direction;

emitting a plurality of light beams from an emitter and toward the first body, wherein emitting a plurality of light beams includes emitting a red light beam, emitting a green light beam, and emitting a blue light beam;

passing a first fraction of each of the plurality of light beams through a transparent portion of the first body;

blocking a second fraction of each of the plurality of light beams with an opaque portion of the first body;

passing a third fraction of each of the plurality of light beams through a transparent portion of the second body;

blocking a fourth fraction of each of the plurality of light beams with an opaque portion of the second body;

directing the third fraction of each of the plurality of light beams toward the target via an optically powered surface positioned between the second body and the target with respect to a path of each of the plurality of light beams;

receiving the third fraction of each of the plurality of light beams via a receiver after the third fraction of each of the plurality of light beams intersects the target; and detecting changes in the light received by the receiver and based on the detected changes determining whether a mark is present on the target at a location coincident with an intersection of the plurality of light beams with the target.

17. The method of claim 15 wherein the optically powered surface is a first optically powered surface of a lens, and directing the third fraction of each of the plurality of light beams toward the target includes each of the plurality of light beams entering the lens by passing through the first optically powered surface and exiting the lens through a second optically powered surface of the lens.

18. The method of claim 15, further comprising positioning the emitter at a distance from the target such that a light spot formed by each of the plurality of light beams where the plurality of light beams intersect the target substantially overlap.

19. The photoelectric sensor of claim 13, wherein the housing includes one or more supports that secure one or more of the emitter, the optically powered surface, the first body, and the second body relative to each other.

20. The photoelectric sensor of claim 13, wherein the one or more supports are movable within the housing so as to enable adjustment of distances between components of the photoelectric sensor.

* * * * *